Figure 1:
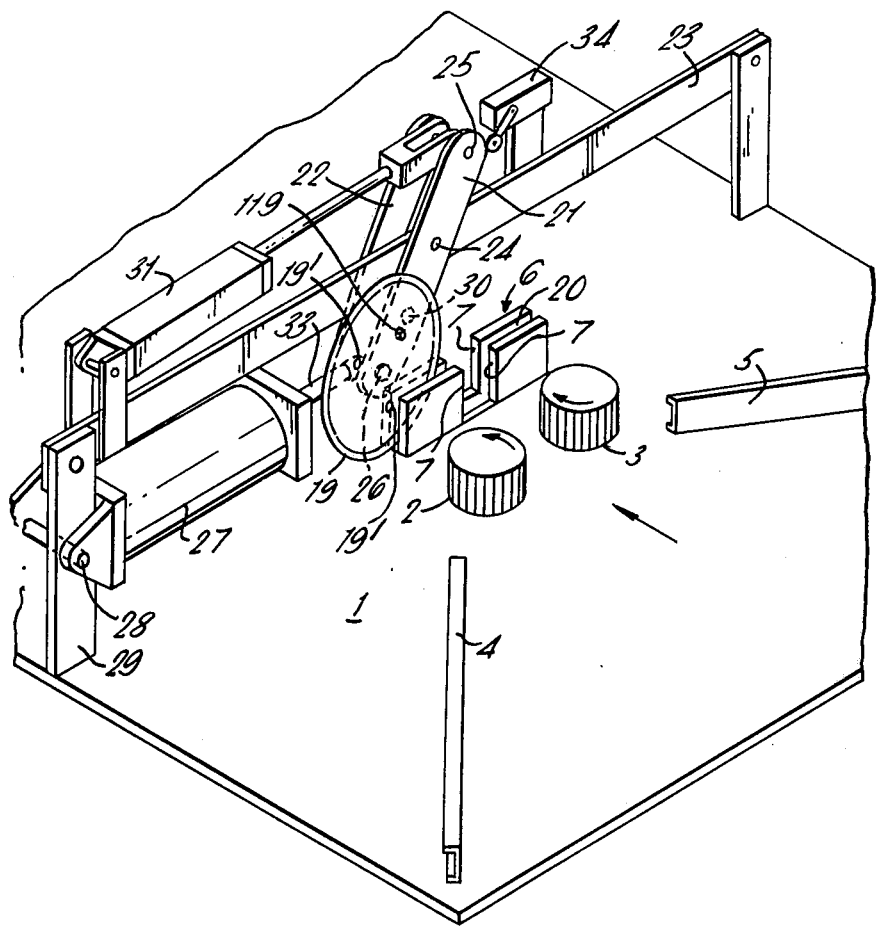

United States Patent [19]
Thwaites et al.

[11] 4,033,251
[45] July 5, 1977

[54] STRUCTURAL CELLULAR MATERIALS

[75] Inventors: Peter John Thwaites, Eltisley; Peter Waterworth Joyce, Eynesbury, both of England

[73] Assignee: Dufaylite Developments Limited, England

[22] Filed: July 20, 1976

[21] Appl. No.: 707,472

[30] Foreign Application Priority Data

July 23, 1975 United Kingdom ............ 30722/75

[52] U.S. Cl. .................................. 100/95; 83/17; 83/19; 83/176; 72/203; 113/116 A; 29/455 LM
[51] Int. Cl.² ........................................ B30B 3/04
[58] Field of Search ................ 83/176, 19; 72/203; 29/6.1, 455 LM; 113/116 A; 100/95

[56] References Cited
UNITED STATES PATENTS

| | | | |
|---|---|---|---|
| 3,108,367 | 10/1963 | Christman | 29/455 LM |
| 3,162,942 | 12/1964 | Christman | 29/455 LM |
| 3,186,271 | 6/1965 | Kaiser | 83/176 |

*Primary Examiner*—Milton S. Mehr
*Attorney, Agent, or Firm*—William Anthony Drucker

[57] ABSTRACT

An apparatus for treating continuous unexpanded structural honeycomb material formed of permanently creasable material comprises rollers for drawing the material in the expansion direction whilst compressing it perpendicularly thereto so that it adopts a second unexpanded state. A guide receives the advancing material and permits slight re-expansion and a double acting severing device, e.g. a circular blade driven by a double-acting ram in forward and return strokes, severs the slightly re-expanded material to form cut lengths. The severing device may be located at the position of a guide of compact form, or at the outlet end of a guide in the form of a channel having at least one resilient wall. A receiving surface, formed in part by a conveyor belt may be provided to receive the cut lengths and allow them to expand. Guides for the expanded material may be arranged to discharge the expanded material from the receiving surface.

17 Claims, 4 Drawing Figures

STRUCTURAL CELLULAR MATERIALS

The present invention relates to structural honeycomb materials formed of permanently creasable material.

Since structural honeycomb material was described in British patent specification No. 591,772, it has been employed on a large scale as a core material for laminated structures, e.g. doors, furniture components and partitioning panels as well as in other applications. It is now produced by various mechanical processes. To avoid cutting losses when forming individual cores, it is desirable to supply the material in continuous form. Apparatus for packaging continuous unexpanded structural honeycomb material by lapping it in a stillage is described in our British patent specification No. 1,397,812.

When the unexpanded material is pulled-out in the direction perpendicular to the planes of the constituent strips, i.e. in the expansion direction, it expands to an open cellular state having a generally hexagonal cell configuration.

In accordance with the present invention, there is provided an apparatus for treating continuous unexpanded structural honeycomb material formed of permanently creasable material which comprises rollers for drawing the material in the expansion direction thereof, compressing it perpendicularly to the expansion direction to a second unexpanded state and advancing it in the second unexpanded state, a guide for receiving the advancing material from said rollers and guiding it forward in a slightly re-expanded state and, for severing the material in the slightly re-expanded state, a double acting severing device and an actuator operable to move the double acting severing device across the material in forward and return cutting strokes.

Using this apparatus, severed lengths of the material are obtainable in a convenient manner and at a rate of output which is sufficient for most commercial purposes. The severed pieces tend to expand perpendicularly to the (original) expansion direction after leaving the guide to adopt a modified expanded state in which the cells have a generally rectangular configuration. In this state, the material is readily handled for use as a core material with any further expansion (perpendicular to the original expansion direction) being simply effected.

According to a feature of the invention, the severing device is preferably a blade having a forward cutting section and a reverse-cutting section bound by a common continuous arcuate cutting edge. A preferred arrangement is to employ a circular blade, the forward- and-reverse cutting sections then simply being different parts of the periphery. These parts may be substantially contiguous. The circular blade is simple to sharpen when required. Only a part of the circular cutting edge is used at a time and a previously unused part may be brought into the cutting position as desired by simple rotation. The cutting action of the blade does not depend upon rotation thereof, i.e. no provision for rotating the blade during a cutting stroke is required.

The severing device travels easily through the slightly re-expanded material, so much so that a rapid cutting action is obtainable with an economic mechanical construction. No robust guide such as a slideway for the severing device is required. An economic and preferred arrangement is to mount the severing device upon a carrier which is pivotally movable by the actuator to provide arcuate forward and return cutting strokes. An actuator of the pneumatic ram type, conveniently a single, double-acting pneumatic ram is, advantageous because of its motion characteristics.

The guide for receiving the advancing material and guiding it in a slightly re-expanded state need only restrain the material against major re-expansion at the position of the severing device. For this purpose it is adequate to provide a simple guide such as a slotted plate adjacent to the severing device. A preferred arrangement is to provide a pair of such guides mounted to provide therebetween a path for traversal by the severing device in its forward and return strokes. Using this arrangement, the cut lengths of material may be allowed to expand after leaving the cutting head, or the cutting head may be followed by a restraining channel. At least a portion of a required severed length of the material is then located in the channel at the time it is severed by the severing head. By providing the channel with a photo-cell or other means for sensing the removal of a severed length of the material, and providing a control circuit responsive to the sensing means, the apparatus may be arranged to produce a new severed length of material ready for use each time a severed length is removed from the channel, e.g. manually. The channel, or a significant part of the channel, can be housed within a safety cover for preventing access to the severing head by the operator.

In another form of the apparatus, intended for high-speed operation the severing head is provided at the end of the channel remote from the compressing and advancing means and the channel has at least one resilient wall. During each severing stroke, the severing head briefly restrains movement of advancing material out of the said end of the channel. The delivery of advancing material into the opposite (entrance) end of the channel during the periods of restraint is accommodated by flexure of the resilient wall.

Figure 2:
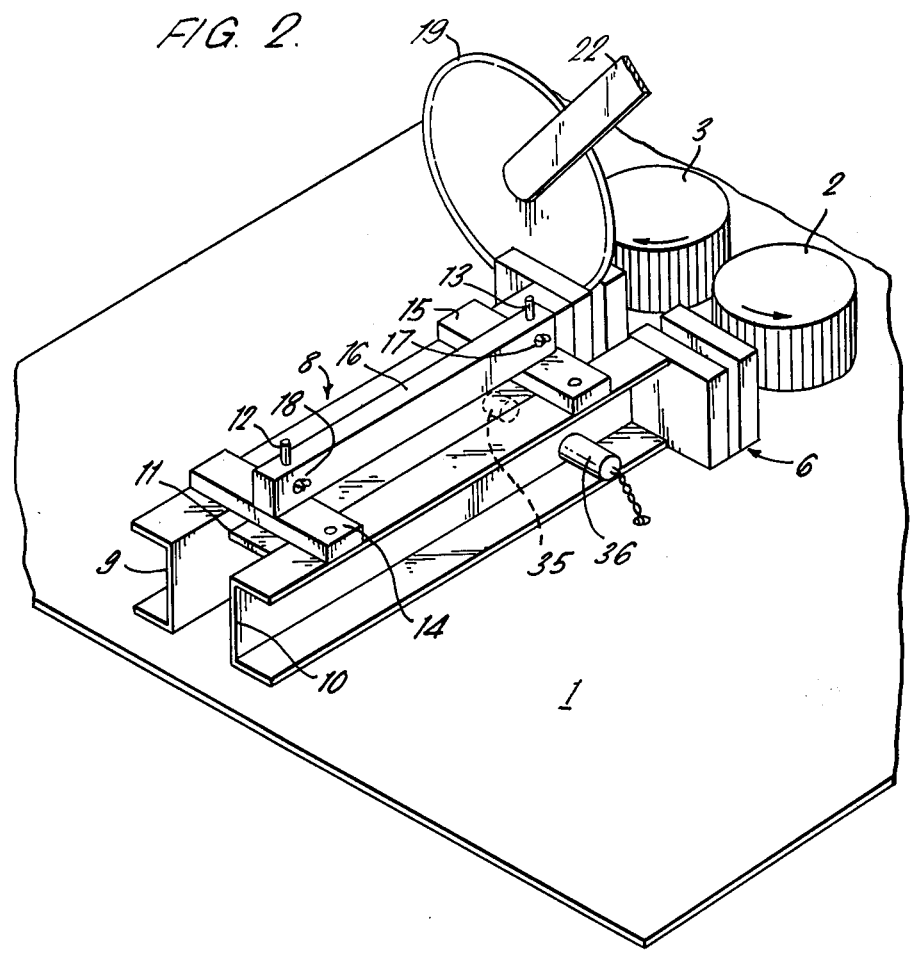
Figure 3:
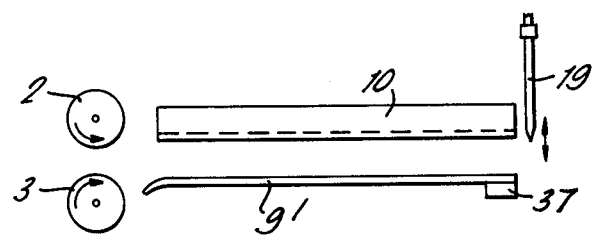
Figure 4:
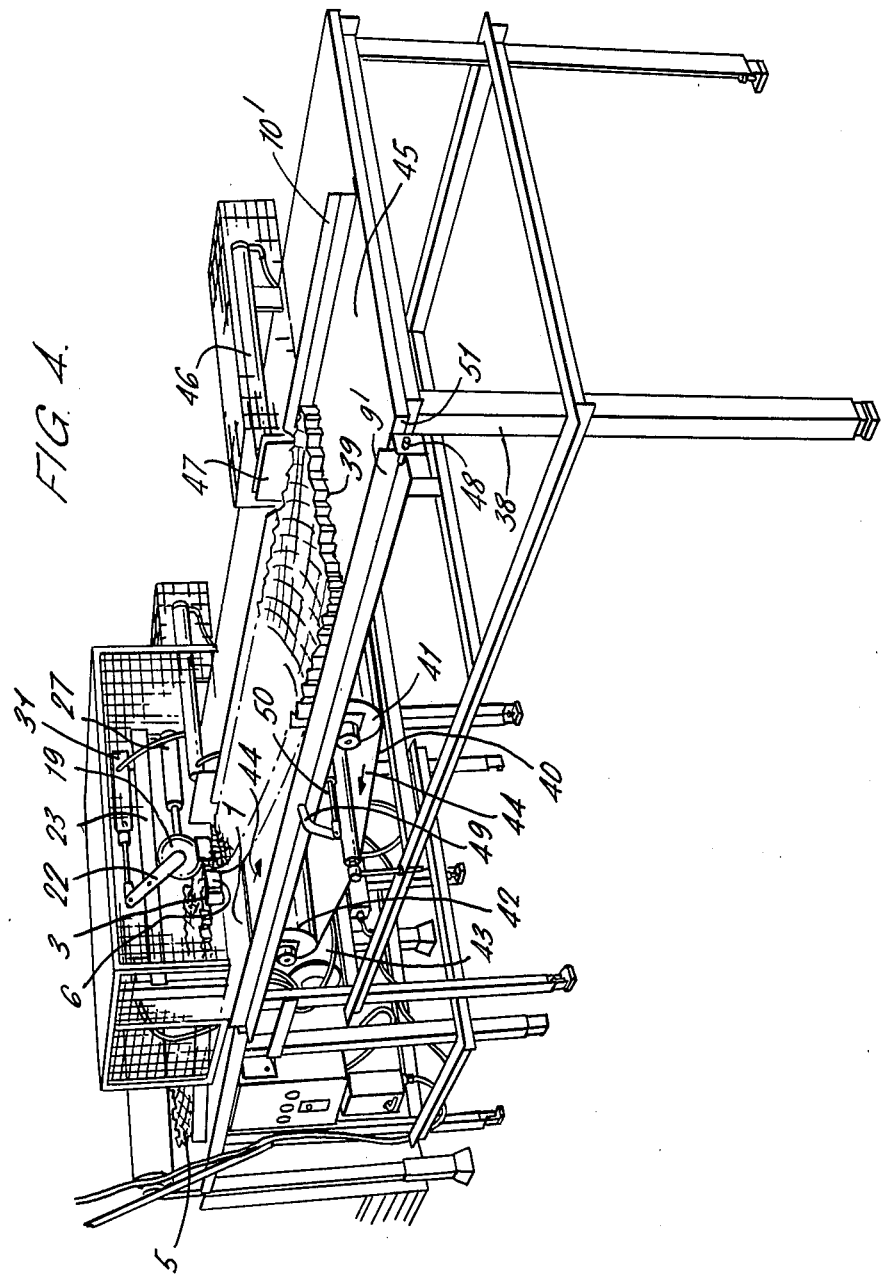

The following description in which reference is made to the accompanying drawings is given in order to illustrate the invention. In the drawings:

FIG. 1 is a perspective showing part of a preferred embodiment of the apparatus from one side of the severing head, FIG. 2 is a perspective showing the remainder of the apparatus from the other side of the severing head, FIG. 3 shows a modification of the apparatus in plan, and FIG. 4 shows another embodiment of the apparatus in perspective.

A base plate 1 has on its underside a drive mechanism (not shown) for driving vertical rollers 2 and 3 in the direction shown to draw unexpanded honeycomb in the direction of the arrow in its normal expansion direction. The honeycomb is expanded, in its direction of travel, to the normal hexagonal cellular state and is compressed across the normal expansion direction by the rollers 2 and 3. Mutually converging members 4 and 5 guide the edges of the honeycomb towards the rollers 2 and 3.

The resulting strip of transversely compressed material passes through a guide 6 in the form of a pair of plates cut away to provide vertical edges 7 which are spaced apart by a greater distance than the nip between the rollers to permit slight re-expansion of the material. Beyond the guide 6 is a restraining channel 8 constituted by a pair of wall members 9 and 10 between which is positioned a plate 11. Plate 11 is secured to a pair of vertical rods 12 and 13 which pass upwardly through apertures in cross members 14 and 15. Above members 14 and 15, the rods are joined by a bar 16 adjustable in position by screws having wing nuts 17 and 18. The spacing between the opposed faces of the wall members 9 and 10 is slightly greater than the spacing between the edges 7. Consequently a slight further expansion occurs in the material as it passes from the guide 6 to the channel 8. In the channel 8 the material is positively located by the pressure exerted by plate 11.

A circular blade 19, movable with clearance, through the space 20 between the plates constituting the guide 6 is mounted upon a carrier in the form of a pair of arms 21 and 22 carried one on each side of a cross bar 23 by a common pivoting pin 24. Near their ends the arms 21 and 22 are linked by pins 25 and 26 the latter of which extends beyond arm 21 to provide a central mounting for blade 19. Blade 19 has three holes 19' spaced 120° apart at constant radius. The blade may be secured in any one of three orientations by a screw 119 passed through a hole 19' into arm 21.

A double acting pneumatic ram 27, pivotally mounted at 28 upon a support 29 for cross bar 23 is linked to arms 21 and 22 by a pin 30. Actuating of ram 27 swings the arms 21 and 22 to and fro to move the blade 19 in arcuate forward and return strokes, through the guide 6, between rest positions in which the blade 19 is clear of the edges 7. A smaller pneumatic ram 31 is pivotally mounted at 32 and linked with pin 25. Ram 31 is driven pneumatically over its out stroke only and compensates for the reduced force exerted by ram 27 during the return stroke thereof when the effective piston area is reduced by the cross sectional area of piston rod 33.

Limit switch 34 switches a solenoid valve which reverses the action of the rams.

The rapid transit of the circular blade 19 obtained pneumatically, provides clean effective severing of the slightly expanded material in the guide 6. Removal of a severed length of material manually from channel 8, allows a photo-cell 35 of the cadmium sulphide type to be illuminated by light, received across the channel 8, from a light source 36 and thus produce a signal for actuating the rollers 2 and 3 to compress and advance further material. The rollers 2 and 3 and the rams 27 and 31 are operated to deliver and cut a chosen length of the material and cease operation when photo-cell 35 produces the actuating signal.

Cross bar 23 is vertically adjustable to compensate for reductions of the diameter of the blade 19 on re-grinding, being slotted where it is bolted to support 29.

Blade 19 can be changed in its orientation to bring a new part of its cutting edge into operation by stopping the machine, removing screw 119, rotating the blade through 120° and inserting the screw through another hole 19'. This quick adjustment can be performed without substantial interruption of the apparatus during a working shift. Changing of the blade between shifts is a simple and economic operation.

In the modified form of the apparatus shown in FIG. 3 wall member 9 of the channel is replaced by a leaf spring 9' carried by a mounting 37 at the exit end of the channel and the circular blade 19 is positioned to sever the material at the exit end. The rollers 2 and 3 are run continuously. Whilst movement of the advancing material is arrested by the action of the blade, oncoming material entering the channel from the rollers is accommodated by flexure of spring 9'.

The apparatus of FIG. 4 is generally similar to the apparatus of FIGS. 1 and 2 up to the circular blade 19. The guide 6 is however omitted, and the severed lengths of material are delivered on to a table, generally indicated at 38, provided with two longitudinal members 9' and 10' formed of lengths of angle section.

As a length of material is being delivered by the rollers 2 and 3, its leading cut end part 39 drops on to the top lap of a conveyor belt 40, which forms the first part of the surface of the table and is carried by belt-rollers 41 and 42 of which the latter is driven by rotary pressure roller 43 so that the belt is moved in the direction of arrows 44. The driving mechanism for the belt 40 is arranged to give the belt a rate of movement less than the speed of the material, advanced by the rollers 2 and 3, by such an amount as to match the speed of the material in its re-expanded condition.

Beyond the upper lap of the belt, the table 38 has a smooth surface part 45 along which the end part of the material is pushed after leaving the upper lap. As the end of the material is moved along the upper lap and subsequently surface part 45, it expands transversely being guided by contact with members 9' and 10'. When the material is again cut by blade 19, the cut length continues to be moved by the action of belt 40 so that the new terminal cut end is moved clear of the blade 19 and guide 6. The cut length then assumes a generally rectangular form between the members 9' and 10'.

Member 10' is mounted upon a long-stroke pneumatic ram 46 by a head 47. Member 9' is retractable below the surface of the table. In the case shown it is pivoted at its ends at a position below the surface 45 and the upper lap of the belt, one pivot, 48, being shown in FIG. 4. At its centre member 9' has secured a crank 49 which causes it to pivot when connecting rod 50 is pulled by means, not shown, associated with ram 46. This pivoting movement rotates member 9' to below the level of surface 45 and the upper lap of the belt. Long-stroke ram 46 acting upon member 10' can accordingly push the cut length of re-expanded material sideways beyond the edge 51 of the table before returning members 9' and 10' to the positions shown.

In an alternative arrangement, member 9' may be arranged to engage the re-expanded material and pull it sideways from the table. Member 10' can then be fixed.

The rollers 2 and 3 of the apparatus are driven continuously and blade 19 is actuated to and fro to cut substantially equal lengths of material. Ram 46 is actuated to deliver the re-expanded lengths beyond edge 51 as they are formed and has a rapid return-stroke for restoring the members 9' and 10' to the positions shown in time for receiving the next length after a length has been delivered. Various ways of handling the delivered re-expanded lengths are possible. They may be allowed to pile upon trolleys moved to the side of the apparatus in turn or may be carried away by a conveyor belt.

The apparatus is of especial value where the re-expanded material is required as a core material in the production of doors and other panels of standard size by rapid continuous production methods.

We claim:
1. Apparatus for treating continuous unexpanded structural honeycomb material formed of permanently creasable material which comprises roller means for drawing the material in the expansion direction thereof whilst compressing it perpendicularly to the expansion direction to a second unexpanded state and advancing it in the second unexpanded state, a guide for receiving the advancing material from said rollers and guiding it forward whilst permitting it to expand to a slightly re-expanded state and, for severing the slightly re-expanded material in the slightly re-expanded state, a double acting severing device and an actuator operable to move the double acting severing device across the material in forward and return cutting strokes.

2. An apparatus according to claim 1, in which the severing device is a blade having a forward-cutting section and a reverse-cutting section bound by a common continuous arcuate cutting edge.

3. An apparatus according to claim 2, in which the blade is a circular blade.

4. An apparatus according to claim 1, in which the severing device is mounted upon a carrier which is pivotally movable by the actuator to provide arcuate forward and return cutting strokes.

5. An apparatus according to claim 1, in which the actuator is a double acting pneumatic ram.

6. An apparatus according to claim 1, in which the guide is one of a pair of guides, said guides being mounted to provide therebetween a path for traversal by the severing device in its forward and return strokes.

7. An apparatus according to claim 1, in which the cutting head is followed by a restraining channel for locating at least a portion of a required severed length at the time it is severed by the severing device.

8. An apparatus according to claim 7, in which the channel is provided with means for sensing the removal of a severed length of the material from the channel.

9. An apparatus according to claim 8 having a control circuit responsive to the sensing means and operable to actuate the apparatus to produce a new severed length of material when a severed length is removed from the channel.

10. Apparatus for treating continuous unexpanded structural honeycomb material formed of permanently creasable material which comprises roller means for drawing the material in the expansion direction thereof whilst compressing it perpendicularly to the expansion direction to a second unexpanded state and advancing it in the second unexpanded state, a channel, having at least one resilient wall, for receiving the advancing material and being dimensioned to permit expansion of the material to a slightly re-expanded state, said channel having an entrance for receiving the material from said rollers and an exit, and, adjacent the exit, a double acting severing device for severing the material in the slightly re-expanded state and an actuator operable to move the double acting severing device across the material in forward and return cutting strokes.

11. An apparatus according to claim 1, in which the severing device is followed by a receiving surface for receiving severed lengths of the material from the severing device and permitting them to expand thereon.

12. An apparatus according to claim 11, in which the receiving surface is constituted in part by a conveyor belt and in part by a smooth surface part.

13. An apparatus according to claim 12, in which the belt has a driving mechanism arranged to give the belt a rate of movement less than the speed of the material advanced by the rollers.

14. An apparatus according to claim 11, in which the receiving surface is provided with two longitudinal members for guiding the material during the expansion on said receiving surface.

15. An apparatus according to claim 14, in which one of the longitudinal members is operable to deliver the re-expanded material sideways from the table.

16. An apparatus according to claim 15, in which the said one longitudinal member is movable across the table to effect said delivery and the other longitudinal member is retractable below the surface of the table.

17. An apparatus according to claim 16, in which the said other longitudinal member is retractable by a pivoting movement.

* * * * *